US006482497B1

(12) United States Patent
Kay et al.

(10) Patent No.: US 6,482,497 B1
(45) Date of Patent: Nov. 19, 2002

(54) PRESSURE-CYCLED, PACKET-TRANSFER INFUSION OF RESIN-STITCHED PREFORMS

(75) Inventors: Rex W. Kay; Troy L. White, both of Goshen; Craig B. Simpson, Mapleton, all of UT (US)

(73) Assignee: Rocky Mountain Composites Inc., Spanish Fork, UT (US)

( * ) Notice: Subject to any disclaimer, the term of this patent is extended or adjusted under 35 U.S.C. 154(b) by 0 days.

(21) Appl. No.: 09/443,227

(22) Filed: Nov. 18, 1999

Related U.S. Application Data

(60) Provisional application No. 60/110,142, filed on Nov. 30, 1998, and provisional application No. 60/118,132, filed on Feb. 1, 1999.

(51) Int. Cl.⁷ .................................................. B32B 5/12
(52) U.S. Cl. ........................ 428/111; 428/109; 428/172; 428/322.7; 428/375; 428/105
(58) Field of Search ................................ 428/102, 116, 428/104, 111, 367, 375, 396, 902, 105, 109, 110, 172, 322.7

(56) References Cited

U.S. PATENT DOCUMENTS

| | | | |
|---|---|---|---|
| 4,357,193 A | * 11/1982 | McGann et al. | |
| 4,445,951 A | * 5/1984 | Lind et al. | |
| 4,622,091 A | * 11/1986 | Letterman | |
| 4,808,362 A | * 2/1989 | Freeman | |
| 5,106,568 A | * 4/1992 | Honka | |
| 5,266,249 A | * 11/1993 | Grimes | |
| 5,641,366 A | 6/1997 | Hohman | ...................... 156/62.8 |
| 5,721,034 A | * 2/1998 | Seeman, III | |
| 5,875,732 A | * 3/1999 | Chapman et al. | |

* cited by examiner

*Primary Examiner*—Merrick Dixon
(74) *Attorney, Agent, or Firm*—Madson & Metcalf

(57) ABSTRACT

A method and apparatus for manufacturing fiber-reinforced, composite materials relies on one or more processes improving over conventional forming, filling, and processing techniques. A homogeneous resin-stitching process provides for resin stitching for using only 5–20 percent of the rovings in a preform as wetted rovings, cured to maintain a stitching together of the structure. A resin-packet transfer process provides infusion of resins from directly beside a wall of a preform, rather than passing resins throughout the longitudinal length of fibers in a perform. A cyclic vacuum bagging process alternately applied over pressure and outside vacuum to a vacuum bag process, thus relieving pressure, and later, optionally, applying pressure to improve structural strength. Relieving pressure tends to improve (reduce) porosity.

41 Claims, 14 Drawing Sheets

PRESSURE-CYCLED, PACKET-TRANSFER INFUSION OF RESIN-STITCHED PREFORMS

RELATED APPLICATIONS

This application is a continuation of a applications, Ser. No. 60/110,142, filed on Nov. 30, 1998 and directed to Resin Packet Transfer Molding and Ser. No. 60/118,132, filed on Feb. 1, 1999 and directed to Resin Stitching.

BACKGROUND

1. The Field of the Invention

This invention relates to composite materials and, more particularly, to novel systems and methods for improving resin flow into reinforcing preforms of composite structures, as well as improving structural performance of completed composite, reinforced structures.

2. The Background Art

Fiber-reinforced, composite materials typically include a resinous matrix reinforced with fibers embedded in the matrix. Fibers may be formed in individual rovings or tows. Reinforcing fibers may be oriented parallel to one another or across one another. In many instances, intermediate layers of non-oriented mats may also be formed of reinforcing fibers. Various reinforcing materials may include glass, kevlar™, boron, carbon (graphite), and the like. Typical resins are thermoset polymers such as epoxy, polyester, and polyamides.

Composite materials may be formed in sheets to be flexible and somewhat deformable thus, composite materials may be designed as partially-cured, resin-loaded panels, tubes, and the like. In other embodiments, composite materials may be formed as wound structures with resins flowing onto the structure with the rovings, as the rovings are wound thereon. In other embodiments, preforms may contain a large fraction of their eventual resin content, partially cured or uncured but highly viscous or even thixotropic. Thus, a preform may appear in the approximate or exact shape of a structure, although not cured. Typically, during cure, heat facilitate chemical reactions converting liquid resins to solids, or stiff, flexible resins to solids, bonding the reinforcing fibers with the resins into a rigid solid.

In conventional curing, parts may be contained in an autoclave at pressures and temperatures elevated with respect to ambient conditions. Typically, pressures in autoclaves are applied to prevent entrained or absorbed air and other non-condensible (or condensible) gases from expanding, bubbling, and therefore weakening, altering, shifting, or otherwise damaging the integrity, strength, or shape of a structure.

Some preforms are designed to receive a substantial quantity of resin beyond the amount with which they were originally formed. Accordingly, structures may be laid into molds or placed in vacuum bags to facilitate flow of additional resin into the interstitial spaces remaining within the rovings, or even the matrix, of a preform.

Limitations arise in manufacturing composite materials by conventional methods. At least three difficulties arise with molded preforms. First, preforms contain sufficient resin to greatly inhibit the flow of additional resin through the rovings, and especially past the matrix portions of a preform. Second, conventional molding techniques flow resin through a comparatively circuitous path of a preform. Thus, flows are uneven, subject to the boundary layer effects well known in fluid mechanics and rheology, and the subsequent variations in pressure, void percentage, gas entrainment, gas absorption, and the like.

Moreover, since preforms typically have a substantial fraction of their ultimate resin content already in a stabilized, suspended, partially cured, or otherwise committed state, bubbles are virtually impossible to prevent or remove in the layup matrix. Even if a matrix is not a complete "PrePreg" system having all of the resin present, obtaining adequate, well-distributed, gasless flows of resins is difficult.

Moreover, the "plumbing" required for fluid handling can be enormous. For example, the air flows accommodated are only the beginning of problems. Flows of matrix resins must be accommodated within the preform, the eventual part to be cast, but likewise through breather mats, runners, and various other flow lines designed to carry the matrix resin to the structure molded, and away therefrom. Cleanup and reuse of runners, tables, and the like requires substantial effort for timely removal of excess resin flows.

Third, the question of vacuum versus pressure tends to provide uneasy compromises. Molding liquid resins under vacuum conditions can remove bubbles. However, compression molding can provide closer proximity between rovings, improving strength. Pressurizing a composite layup tends to leave absorbed or entrained gases. Vacuum drawn on a preform or composite layup during manufacture tends to release gases from solution or entrapment creating bubbles that damage structural integrity.

Currently, pressurized autoclaves, and vacuum chambers both fail to completely satisfy the need to remove trapped or entrained air, non-condensible gases and the like, while also providing structural proximity for roving fibers throughout the structure, as needed for maximum strength.

What is needed is an apparatus and method adapted to create preforms in a manner that will maintain structural shapes and dimensions precisely, while still accommodating high speed flows of resin therethrough, completely sweeping the matrix space. Likewise, ready evacuation of all gases from a preform, prior to flooding with resin, is needed.

What is also needed is an improved resin flow path that does not require the current, clumsy, cluttered, collection of pipes, pumps, and passages for transferring gases and liquids. A clean, straightforward method for resin infusion is needed.

Also what is needed is a process that can take place outside an autoclave and thus accommodate larger parts, while eliminating bubbles by optimizing the vacuum history of a mold. Doing so would be very beneficial if done while also maximizing structural integrity by providing a vise component or clamping component to place tows, rovings, or the like in preforms, mats, or other shapes under the proper loads to assure the best structural properties. Thus, this last requirement requires a new balance using vacuum techniques, pressure techniques, and combinations to obtain the best performance of each.

BRIEF SUMMARY AND OBJECTS OF THE INVENTION

In view of the foregoing, it is a primary object of the present invention to provide three new processes, and apparatus for accomplishing those processes, as well as a device or apparatus as an output of one or more of those processes.

It is an object of the invention to provide a resin-stitching process by which a preform of virtually any shape may be constructed having sufficient resin to maintain structural shape and integrity during handling and molding processes but with sufficient space to eventually add, flow, and distribute the majority of resin to the preform.

It is an object of the invention to provide a resin-packet-transfer process by which resin is applied to a preform to flow transversely through the minimum dimension of a structure or layup of rovings, rather than flowing only longitudinally along reinforcing fibers over comparatively extensive distances.

It is an object of the invention to provide a single and a multi-cycle evacuation and unloading process and also to provide same in cycled combination with a pressurization and loading process for removing gases, whether entrained or absorbed, with or without compacting the structure.

It is an object of the invention to provide an improved evacuation process in combination with a pressurization process for fiber-reinforced composite manufacture, especially suitable for use on large structures outside an autoclave.

Consistent with the foregoing objects, and in accordance with the invention as embodied and broadly described herein, an apparatus and method are disclosed, in suitable detail to enable one of ordinary skill in the art to make and use the invention. In certain embodiments an apparatus and method in accordance with the present invention may include one, more than one, or all features of the invention. Four principal features include homogeneous-resin-stitched reinforcing fiber structures (preforms), resin-packet transfer molding to infuse resin into reinforcing fiber structures, multiple containment (bagging), and cyclical evacuation and pressurization of structures during manufacturing for ensuring minimum voids, maximum flow, optimum strength, and maximum structural integrity.

Thus, in certain embodiments, the invention may include a preform manufactured as if it were a layup or filament winding of a structure. However, only a small fraction of the rovings will actually be coated with resin during the layup. As a result, resined tows or rovings will bond, upon curing, to adjacent tows and rovings, and especially to other, sparsely located, resined tows. The result is a structurally stable (even rigid, if desired) reinforcement preform containing a comparatively small amount (typically less than 20 percent, to less than 5 percent) of its ultimate resin capacity.

In certain embodiments, an apparatus and method in accordance with the invention may provide a resin packet having a perforated sidewall. The resin therein may be contained as a gel, as a viscous or inviscid liquid, or as a thixatropic suspension. A stabilizing mat for preventing collapse of the packet or for rapid flow of the resin may fit inside, between two walls of a packet or envelope of resin. The resin may be selected to have a melting point or flow point above ambient conditions. Thus, the resin packet shape may be comparatively stable for handling. In one embodiment, the resin may have such a high viscosity as to have unnoticeable flow properties at ambient conditions.

Nevertheless, by whatever means, the resin may later be heated or otherwise rendered flowing for ready infusion into a preform. The resin may be drawn by an applied vacuum through a perforated wall of the envelope to flow directly and transversely through a preform or composite fiber layup.

In certain embodiments of apparatus and methods in accordance with the invention, multiple "bags" (chambers) may provide cyclical control of evacuation of gases from a preform contained therein. In selected embodiments, vacuum bags may be doubled under a bell or a bell may be treated as a second vacuum chamber for both relieving and raising pressure in order to expedite evacuation of entrapped air and consolidation of parts.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 16, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only as an example, and simply illustrates one presently preferred embodiment that is consistent with the invention as claimed.

Figure 1:
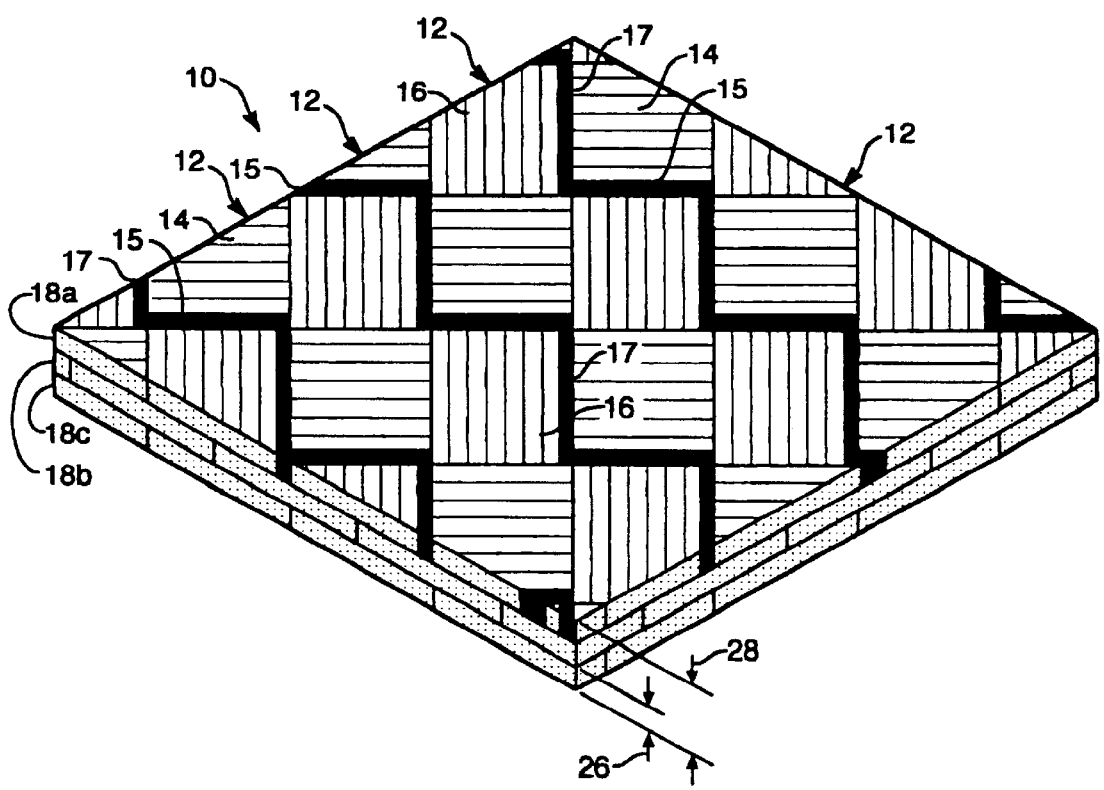
FIG. 1 is a perspective view of one embodiment of a woven preform.

Referring to FIG. 1, an apparatus 10 may be embodied as a resin-stitched preform 10, ultimately to be a homogeneously stitched, fiber-reinforced, composite material structure 10. An apparatus 10 may be embodied in any of the arrangements illustrated in FIGS. 1–3, as well as in certain other shapes or layered configurations known in the art. In general, an apparatus 10 comprises a plurality of rovings 12, or tows 12. The tows 12 may be direct tows 14 or (direct rovings 14) or offset rovings 16 (offset tows 16).

Figure 2:
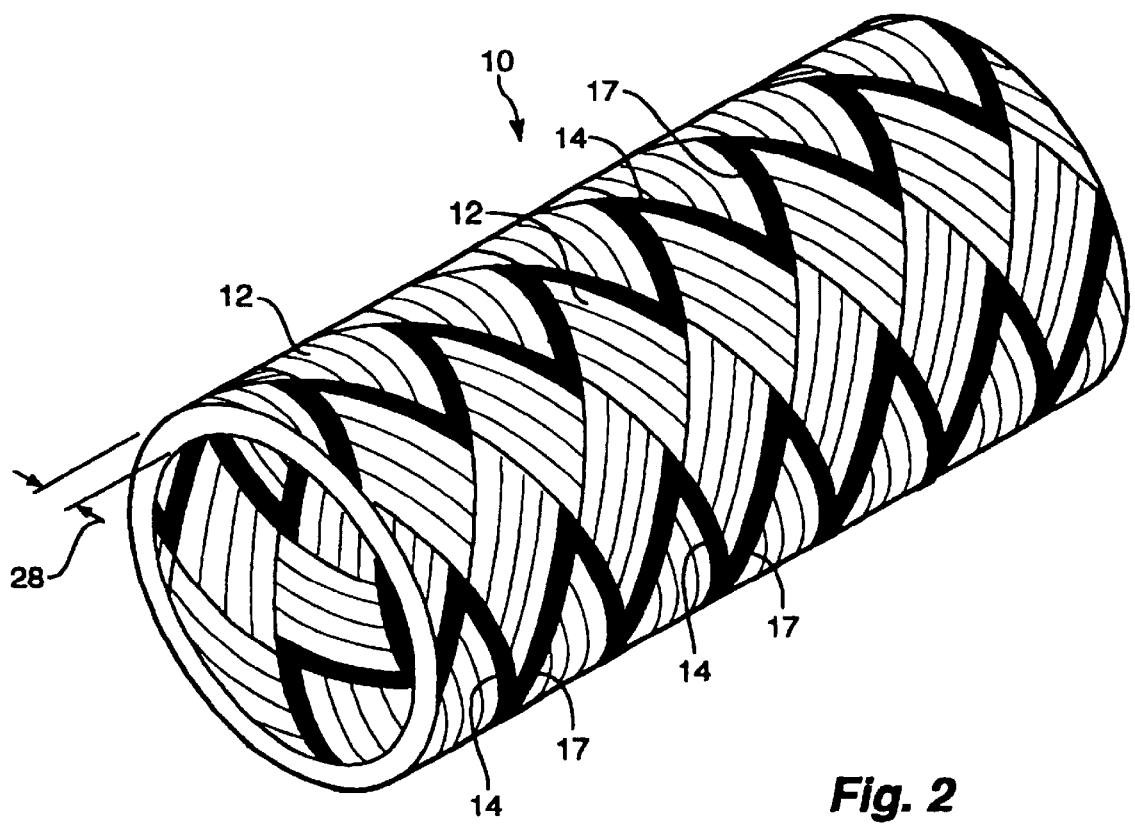
FIG. 2 is a perspective view of one embodiment of a filament wound preform.
Figure 3:
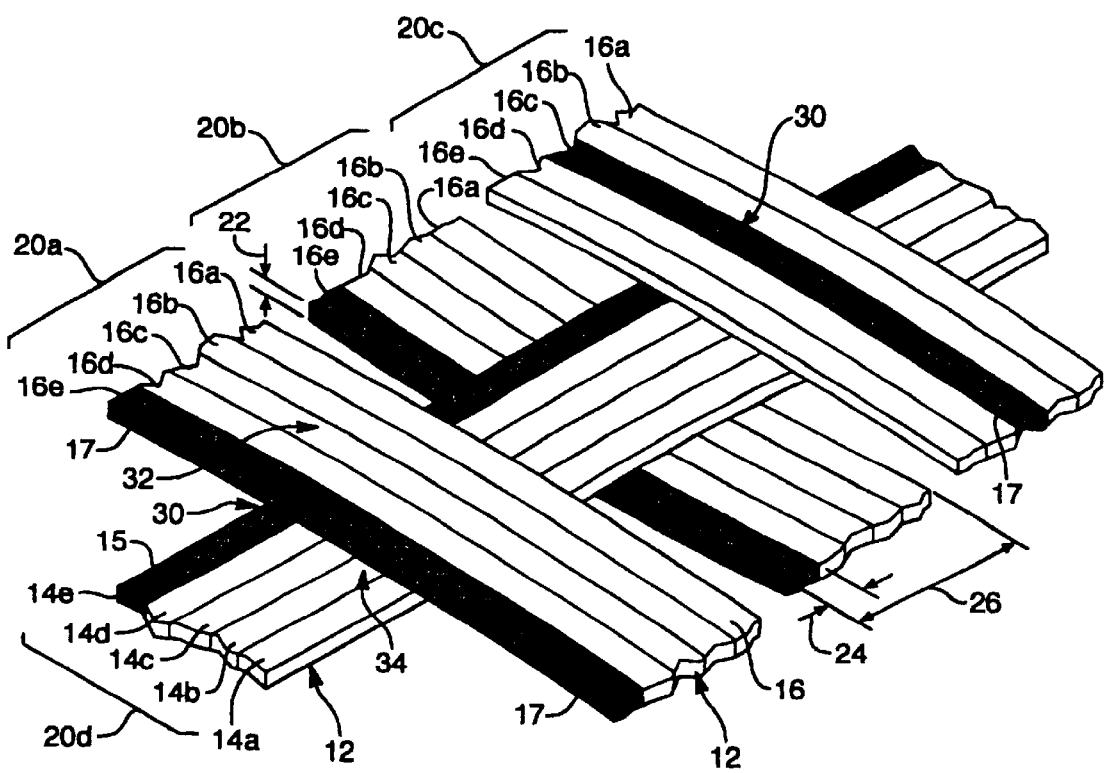
FIG. 3 is a perspective view of layered rovings in a preform in accordance with the invention.

Specification of direct tows 14 and offset tows 16 is primarily for convenience in describing FIGS. 1–3. Rovings 12 may be wrapped, formed, laid, wound, or otherwise positioned with respect to one another in an infinite variety of patterns. Filament winding appears to be the most efficient laydown method for rovings. Filament winding, provided with a proper mandrel and winding system, can be completed in an infinite variety of shapes.

Of the tows 12, resined tows 15 of the direct tows 14 are some subset of all of the tows 12 or rovings 12 used in the apparatus 10. The resined tows 15 may typically be 5 to 20 percent of all of the direct tows 15. Similarly, offset resined tows 17 are selected from the offset tows 16 to be resined and either cured or partially cured. In general, the resined tows 15, 17 may be partially cured as with a "B-staged" layup, or may be completely cured. In some embodiments, an apparatus 10 may be formed to have a large void fraction and a small percentage of resined tows 15, 17. Thus, the apparatus 10 may be properly infused with resin later, with minimum obstructions to flow.

In an alternate embodiment, resined tows 15, 17 may be replaced by a simple pattern of resin dripped over the apparatus 10 periodically. A comparatively light (typically a 5–20 percent) fraction of the ultimate matrix volume is all that is required. In yet another embodiment, an apparatus 10, as a preform 10 may be sparsely stitched but heavily covered externally after winding. In this latter embodiment, a larger proportion of fibers requires limited interstitial filling by resin later. Thus, heating the pattern of previously drizzled resin applied to the outside surface of a preform reduces viscosity, melts or otherwise promotes flow of the resin into the tows 12.

The apparatus 10 may be cured by a variety of methods. For example, the resined tows 15, 17 or drizzled stitching pattern 15, 17 may be cured by heating a thermoset resin applied at a sufficiently high temperature to cure promptly upon laydown. Alternatively, and more typically, a preform shape of an apparatus 10 may be heated in an oven after construction. As mentioned, B-staging a resin provides a partial cure. Additional cross-linking of molecules within the resined tows 15, 17 as well as between the resined tows 15, 17 and the additional matrix filling the remainder of the tows 12 and the apparatus 10 may occur at a later step.

An apparatus 10 may also be comprised of layers 18. For example, in the embodiment of FIG. 1, layers 18a, 18b, 18c, are adjacent to one another. Nevertheless, in filament winding processes, layers 18 are not necessarily distinct from one another. That is, an individual group 20 of rovings 12 may be laid down as a band, and interleaved as a series of direct 14 and offset 16 tow groups. Thus, layers 18 may actually only appear in a cross-sectional view at a particular plane in space.

As in FIG. 1, the cylindrical apparatus 10 of FIG. 2, and the layup 10 or apparatus 10 of FIG. 3 may have wraps 20, or groups 20 of rovings 12. For example, the individual wraps 20a, 20b, 20c, 20d are typically fed with all of their respective rovings 16a, 16b, 16c, 16d, 16e or 14a, 14b, 14c, 14d, 14e laid down at the same time. Thus, individual wraps 20 may be overlaid. Thus, a layer 18 may actually be comprised of one complete cycle of wraps 20 on a particular apparatus.

Nevertheless, filament winding and other layup methods for a fiber reinforced apparatus 10 may rely on any technique, pattern, material, and process available and known in the art.

In general, a thickness 22 of an individual roving 12 may depend on the winding technique, the machine, the bulk of the roving, and so forth. Similarly, the width 26 of a roving 12 in a wrap 20 may be determined largely by tension maintained on a roving 12, as well as the bulk of the roving 12, and the winding machinery employed in the process.

The width 26 of an individual wrap 20 or pass 20 may vary substantially. Again, the individual widths 26 and thicknesses 22 of individual rovings 12, as well as the void fraction that may exist within transition regions between individual wraps 20, may determine, or be determined by, the width 26 of any individual wrap 20, and the thickness 22.

Eventually, a thickness 28 of a particular wall may be comparatively constant, or may vary considerably. Transitions do not happen in zero space. Necessarily, along the length 29 of a particular apparatus 10, substantial variation from point to point may arise from the presence and absence of a tow 12 at an exact location. Nevertheless, by selecting the thicknesses 22 and widths 24 of individual rovings 12, one may control somewhat the variation within each individual wrap 20, and within a layer 18.

Resin stitching using the same resin or even the same type of resin that will be used for a later infusion, may be thought of as homogeneous resin stitching. That is, for example, one may use fiber stitching, or thermoplastic bonding of rovings 12, or wraps 20, or layers 18 to one another for mechanical stability until a later infusion of resin. An apparatus and method in accordance with the invention may instead use the same resin or resin type that will later be used for infusion as a stitching material. Stitching may be accomplished by drizzling resin over a layup, or by including resined tows 15, 17 in the layup. A bond 30 is a double bond 30 where two rovings 12, and specifically, two resined tows 15, 17 cross. The bond 30 involves resin from two resined tows 15, 17. Meanwhile, a single bond 32 results from a resined tow 15 selected from direct tows 14 crossing under or over offset tows 16. Similarly, a single bond 34 or single cross bond 34 results from a resined tow 17 of the offset tows 16 crossing a wrap 20 or group 20 of direct tows 14.

Thus, for example, individual groups 20a, 20b, 20c, 20d may be interleaved (woven) in any selected pattern to provide a series of double bonds 30, and various single bonds 32, 34 distributed throughout. By selecting some optimal set of resined tows 15, 17 a manufacturer may provide large volume fractions of tows 14, 16 that are unresined, and thus capable of conducting away non-condensible gases during the infusion of resin into a preform 10 of the apparatus 10.

Homogeneous resin stitching has substantial advantages over other methods of stitching. Resin stitching provides "tacking" of preform fibers upon laying, supporting complex and non-geodesic patterns. For example, fabric stitching, using roving material or other similar fibers, does not provide the complex shapes that may be needed in a preform. Wet winding will not permit non-geodesic shapes. Even a B-staged or partially reacted matrix of resin may be either too rigid or too flexible for ultimate manufacturing processes. On the other hand, a completely filled matrix, will almost invariably contain too much dissolve air or entrained air, with resulting bubbles damaging the physical integrity and strength of the apparatus 10.

Figure 4:
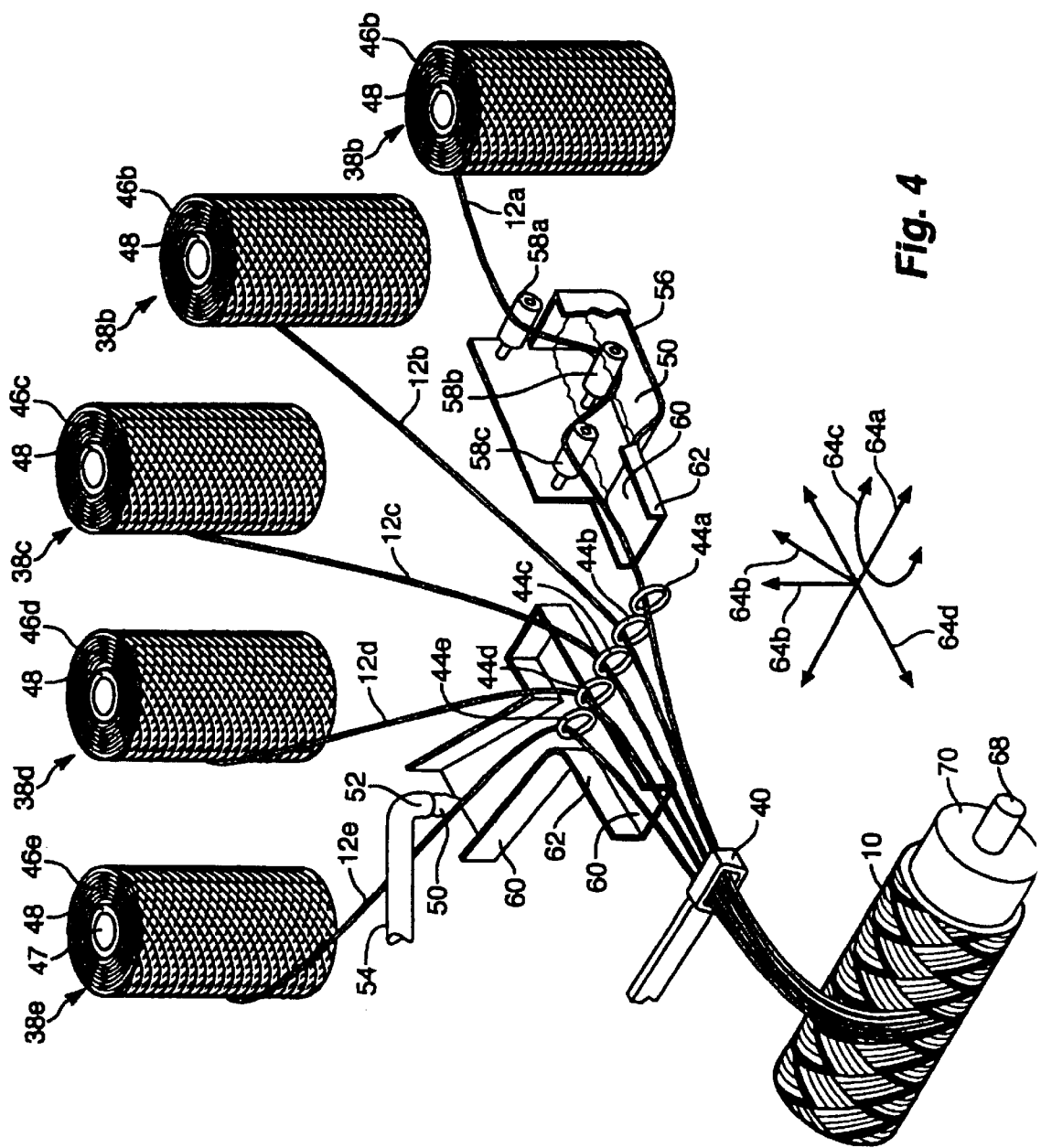
FIG. 4 is an illustration of a filament winding in process, illustrating two wetting methods for individual rovings for a resin-stitched preform.

Referring to FIG. 4, spools 38 (individual embodiments 38a–38e, may all be referred to as supplies 38 or spools 38) may feed individual rovings 12 through a head 40 into a laydown process. For example, a supply 38 of rovings 12 may be threaded through a head 40 carried on an arm 42 or other drive 42 near an apparatus 10 being laid up. Intermediate guides 44 may orient or clear rovings 12. In some embodiments, the guides 44, and tension may orient, flatten, or otherwise align the rovings 12 from the supplies 38. Each supply 38 (38a–38e) maybe provided as fiber 46 held on a spindle through an arbor hole 47 of a spool 48 or core 48.

Two alternative embodiments are illustrated in FIG. 4 to accomplish the resin application process. For example, a resin 50 may be provided through an applicator 52 responsible to apply and embed resin 50 into rovings 12. A supply line 54 may feed an applicator 52. The applicator 52 may drizzle resin 50 onto a tow 12, or onto the outside surface of the preform 10.

In an alternative embodiment, a bath 56 containing resin 50 may simply run a roving 12 (e.g. 12a) over a series of rollers 58a, 58b, 58c in order to coat a roving 12a in the resin bath 50. Drip trays 60 in any particular embodiment may retrieve excess resin dripping from resined rovings 15, 17 or preform 10. Each of the trays 60 may have walls 62 for containing an appropriate amount of resin flowing back to some reservoir (not shown).

In general, an apparatus 10 may be formed to have a longitudinal direction 64a, a radial direction 64b, a circumferential direction 64c, and a lateral direction 64d. In the embodiment of FIG. 4, a filament winding process relies on an axle 68 supporting a mandrel 70. The mandrel 70 or form 70 serves as a base on which rovings 12 may be wound as a preform 10. In selected embodiments, the apparatus 10 may be formed directly. Nevertheless, if a preform 10 condition is desired, a homogeneous-resin preform 10 may be constructed as described.

Angles, spacing, orientation, and the various dimensions 22, 24, 26, 28, 29 of an apparatus 10 or of a particular layer 18 thereof, may be selected according to the material properties available and desired. Control thereof may be performed by any means currently known in the art. Similarly, materials and geometries may be according to those known in the art and developed hereafter. Nevertheless, in certain preferred embodiments of an apparatus 10 in accordance with the invention, void fractions on the order of 80 to 90 percent may be possible. The void fractions when described this way, refer to non-resined regions, whether or not filled by rovings 12. Rovings 12 or tows 12 will inhibit infusion of resin. Nevertheless, under vacuum conditions (with respect to ambient gauge pressure) may aid infusion of resin through the reinforcing fibers of a homogeneously stitched preform.

Figure 5:
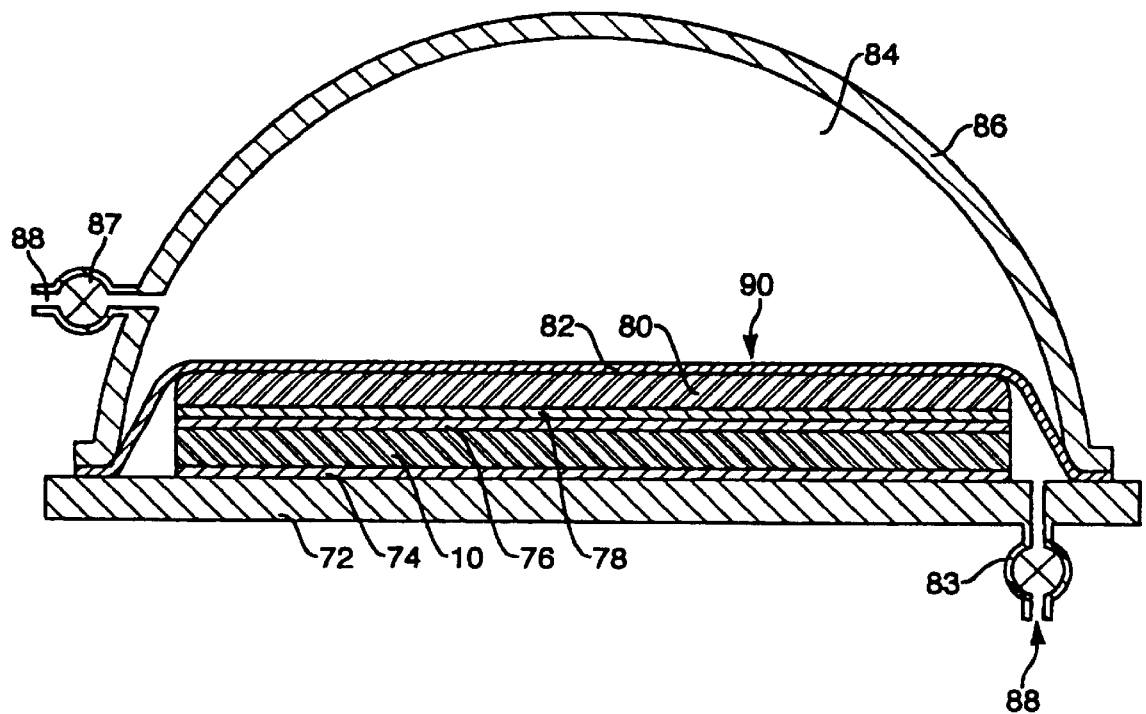
FIG. 5 is a sectioned view of one apparatus for providing a cycled pressure layup.

Referring to FIG. 5, one embodiment for an apparatus and method for forming composite layups may rely on a base 72 coated with a release agent 74, simply referred to as a release 74. The release agent 74 may include various varieties of oils, greases, and other polymers have very low strength. Some embodiments, a release 74 may simply be a cohesively formed plastic that does not readily adhere to other polymers.

A preform 10 or apparatus 10 is placed on the base 72, or more properly on the release 74 supported by the base 72. The base 72 may be shaped according to a preform of some arbitrary part shape. Often a peel layer 76 may be used above the preform 10. However, in certain embodiments, a peel layer may not be used in order to promote infusion in a transverse direction 64e, in addition to the lateral distribution in a lateral direction 64d. A perforation layer 78 or seep layer 78 may provide a somewhat permeable barrier for drawing a vacuum on the apparatus 10. Similarly, a breather 80 provides passage space for air drawn under vacuum away from the preform 10. In general, a vacuum tends to collapse gas channels (airways) and pressurize the layup 10 due to ambient overpressure. The breather 80 serves to provide a structural limitation on a bag 82, preventing the bag 82, from closing off so completely outlet passages for escaping air leaving the apparatus 10 during molding of the matrix.

A valve 83 may control evacuation of air trapped in the preform 10 or under the bag 82. The bag 82 is actually a sealed gas proof membrane for maintaining a vacuum condition about the stack up 90.

A cavity 84 formed under a bell 86 may be evacuated by a vacuum pump operating through a valve 87 and fluid transfer lines 88. This same vacuum pump may be used in certain embodiments to evacuate both the bag 82 and the bell 86.

Figure 6:
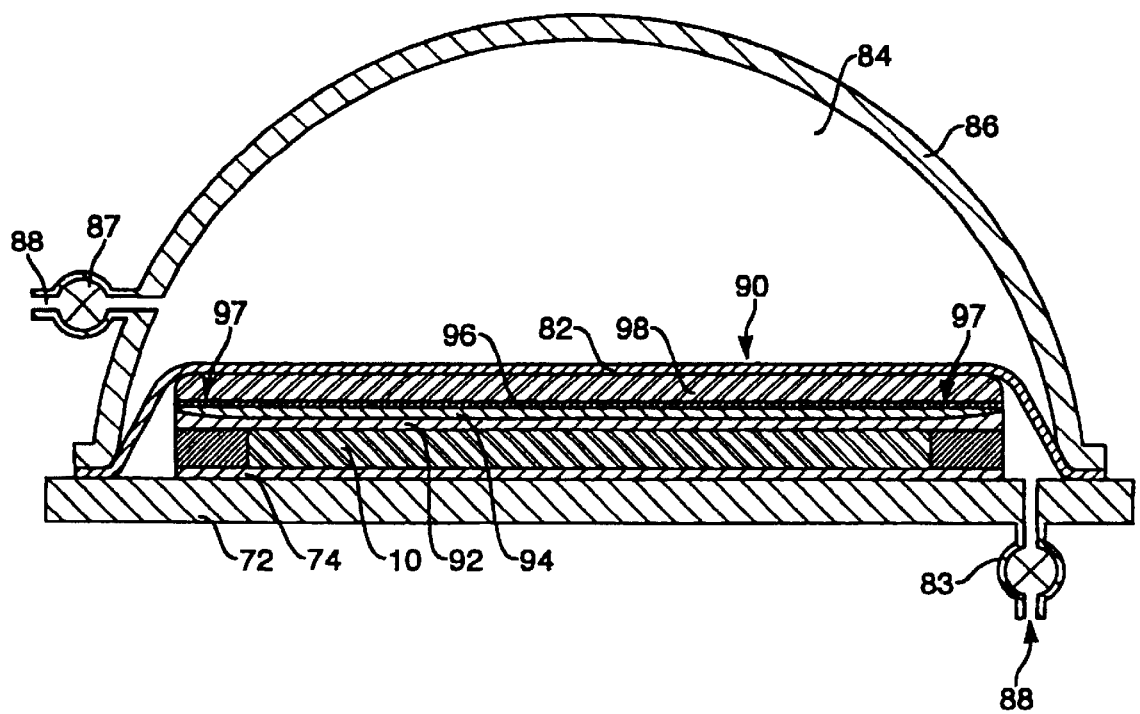
FIG. 6 is a sectioned view of an alternative embodiment of the apparatus of FIG. 5.

Referring to FIG. 6, an alternative embodiment may rely on the base 72 and release 74 supporting a preform 10. Nevertheless, the apparatus 10 may be formed as a high-porosity preform 10 capable of evacuation through a breather 80 surrounding a periphery thereof. In certain embodiments, a perforated layer 92 may contain resin 94 as part of a resin packet 95. In the resin packet 95 of FIG. 6, the resin 94 may be thixotropic, or temperature sensitive in order to maintain some mechanical stability. The perforated bag layer 92 may be sealed by a peel layer 76, or other seal that is removed only during manufacture of the apparatus 10.

Meanwhile, an upper bag layer 96 may be sealed to the lower bag layer 92 along a seam 97 or seal 97. Inside the resin packet 95, the resin 94 may be stabilized by a material, such as breather material or other matting that will prevent pressurization of the resin packet 95 at an inopportune time during handling.

In general, a breather 98 is optional but desirable. As before, the breather 98 provides for complete evacuation of the apparatus 10 prior to infusion of resin 94. Nevertheless, in certain embodiments, the breather 80 provided may be adequate.

Figure 7:
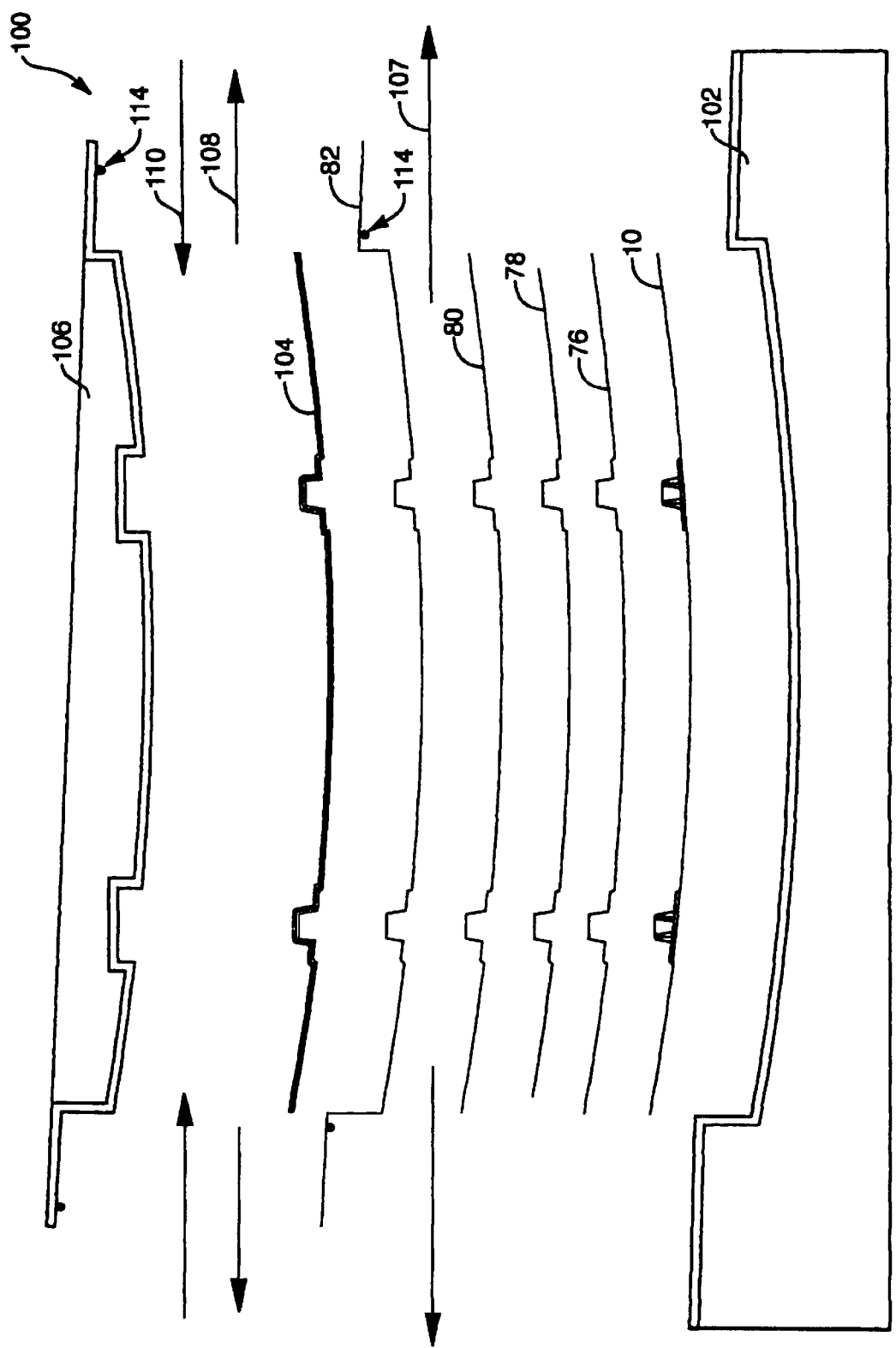
FIG. 7 is a schematic illustration of an apparatus and process for a cycled pressure layup in accordance with the invention.
Figure 8:
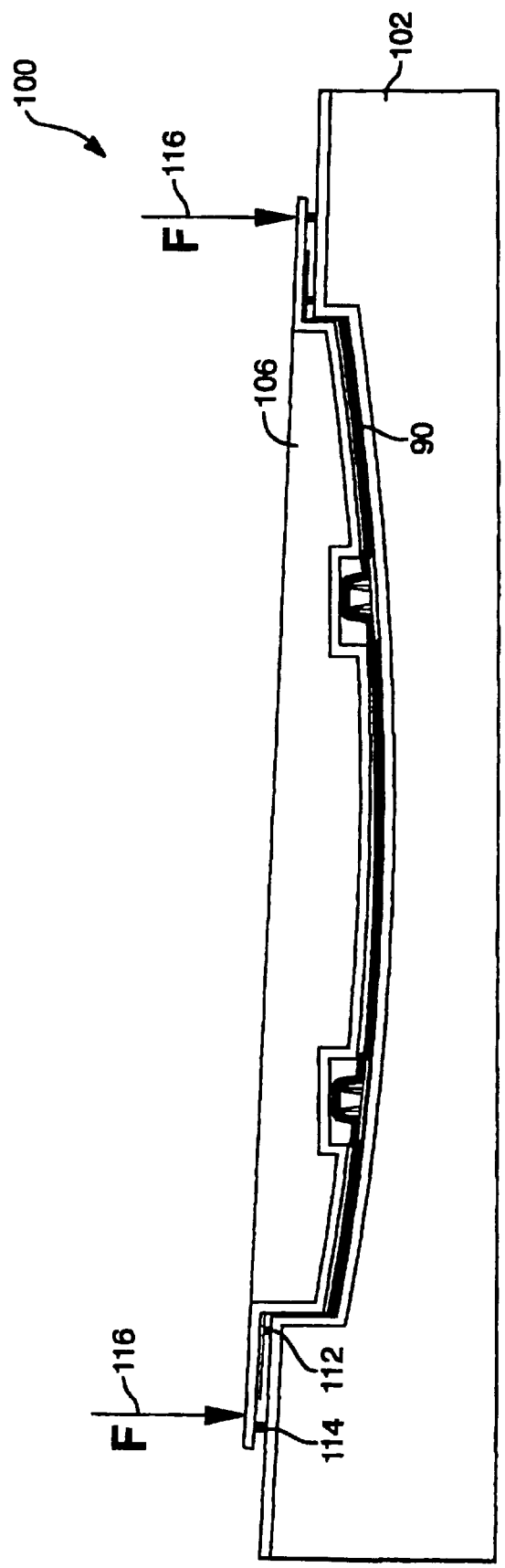
FIG. 8 is a schematic diagram of the apparatus and method of FIG. 7.

Referring to FIGS. 7–8, a mold 100 may be formed in two parts. The drag portion 102, or simply the drag 102, is the lower half of mold 100, supporting the apparatus 10 as a preform 10 and as a completed piece part 10. The inability to illustrate clearly the time sequence within a single illustration requires reference to the apparatus 10 in both the preformed condition as well as the fully molded, cured, completed condition.

In general, a breather 104 provides for freer motion of air within the mold 100. Accordingly, the breather 104 is typically placed near the cope 106, or upper portion 106 of the mold 100. Referring to FIGS. 7–8, the exploded view of a layup 90 and the consolidated view of the layup 90 of a mold 100 is instructive. A flow 107 may be drawn by a vacuum applied to the cavity 105 of the mold 100. The cavity 105 may simply be evacuated, and resin 94 may be introduced thereto. However, in certain embodiments, a flow 108 may be drawn above a vacuum bag 82. One may note that the preform 10 may be laid under a peel ply 76 and a perforated film 78. A breather layer 80 may provide passage of air from the mold 100 under the vacuum bag 82, once the vacuum bag 82 is evacuated. However, in certain embodiments, the vacuum bag 82, itself, tends to crush and close possible passage ways throughout the stack 90. Thus, in certain embodiments, an additional breather pad 104 may be added for supporting a flow 108 under draw of a vacuum pump from above the vacuum bag 82. The flow 108 permits unloading of the ambient pressure from the vacuum bag 82. Accordingly, several pounds per square inch of pressure may be relieved from the stack 90. Accordingly, more passages remain at larger sizes permitting easier flow of both air and resin 84 through the preform 10.

In at least one embodiment of an apparatus and method in accordance with the invention, a flow 110 may add pressure above the vacuum bag 82, by passing pressurized air into the mold cavity 105 through the breather pad 104. In such an embodiment, a flow 110 provides pressure 111 over the vacuum bag 82. Thus, the flow 107 under vacuum aids evacuation inside the vacuum bag 82. The evacuation of the flow 108 above the vacuum bag 82 relieves pressure 111 that may exist due to ambient air or ambient overpressure on the bag 82 in view of the flow 107.

However, once the flow 108 has equalized the pressure across the vacuum bag 82 at a value of somewhere around ten pounds per square inch, or less, gas flow will be comparatively free throughout both the breather 80, and the breather 104. However, compression of the apparatus 10 during molding can be structurally beneficial. Accordingly, a reflood flow 110 or flow 110 may pressurize the vacuum bag 82 with a pressure 111 in lieu of the vacuum draw 108 originally provided in the cavity 105 above the vacuum bag 82. Thus, evacuation can be accomplished as efficiently as possible, while pressurized molding may be accomplished thereafter. One may note that a bag seal 112 and mold seal 114 provide sealing of the mold cavity 105 below and above, the vacuum bag 82, respectively. The seals 112, 114 may be maintained by a clamping mold 116 urging the cope 106 and drag 102 together.

In certain embodiments, resin may be drizzled over a preform in any suitable pattern. Resin may also be applied with any surface void fraction or a real coverage percentage. Moreover, a pattern (e.g. zigzag, cross-hatched, spiral, grid, etc.) of resin flow may harden sufficiently to accommodate handling. Also, such a lattice of resin flow may be built up in one or more passes to virtually any desired thickness on a surface of a preform.

Meanwhile, preforms will have an "absolute" void fraction, meaning the fraction of all volume not filled with reinforcing fibers or with such fibers and the "resin-stitching" resin. By contrast, the "fill void fraction" may be the fraction of the "absolute void fraction" that has not been filled by sticking resin in the preform.

Accordingly, in one embodiment, the thickness of drizzled resin lattice may be designed to provide the entire fill amount required for filling the "fill void fraction" at the time of infusion and cure. The resin in the lattice may be rendered flowable by heat and infused in the fill void space by any of the appropriate processes described herein.

Figure 9:
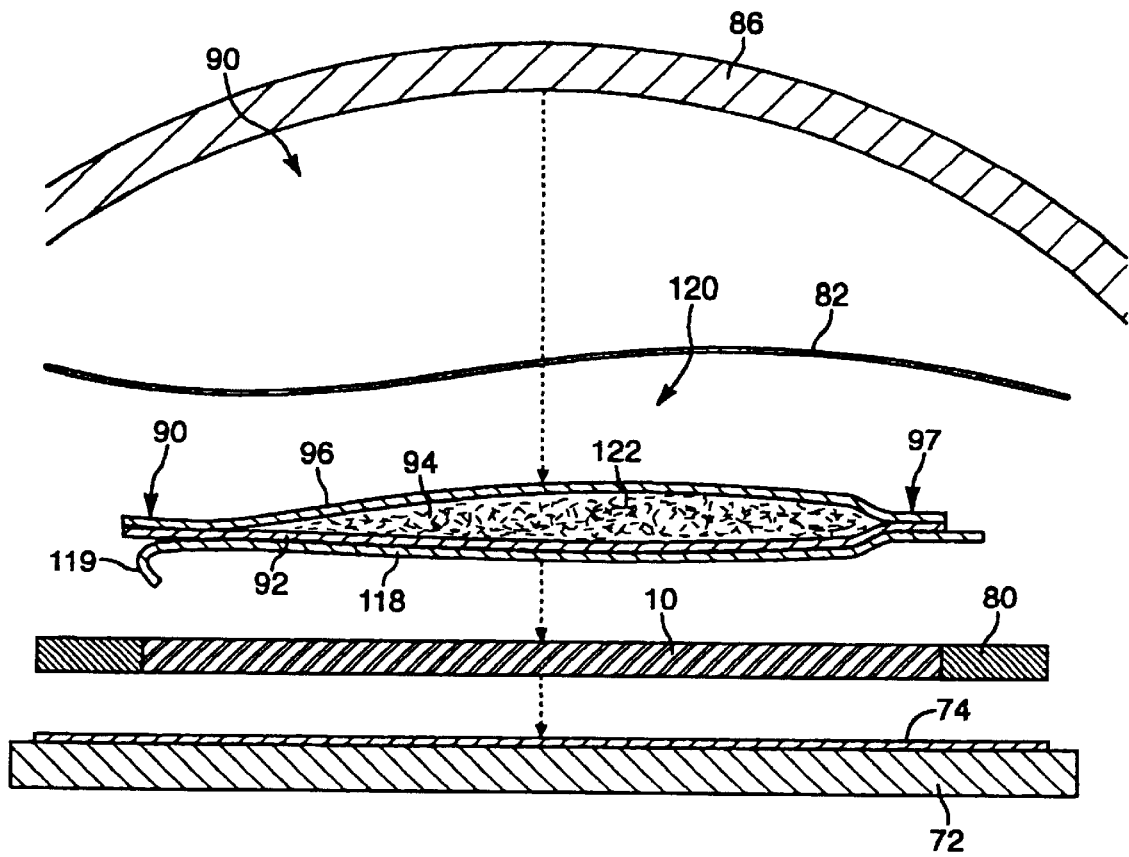
FIG. 9 is a schematic diagram of an apparatus and process in accordance with the invention.

Referring to FIG. 9, an apparatus 10 may be molded using a resin packet 95 having a stabilizer 118 or seal 118, as needed. That is, the perforated layer 92 may or may not resist seeping of the resin 94 from the packet 95. In certain embodiments, the resin 94 may be gelled, or otherwise stabilized to be released by increasing temperature. Thus, peeling the seal 118 from an edge 119 in order to expose the perforated wall 92 of the packet 95 may or may not be required. In one embodiment, the seam 97 or seal 97 may not even be required. Nevertheless, even in liquid resin 94 may be formed in a packet 95, whether or not stabilized by a filler 122 or stabilizer 122 captured between the lower layer 92 and upper layer 96 of the packet 95.

For example, just as a breather 98 may be required to permit flow of gases or liquids within the layup 90, the filler 122 or stabilizer 122 may assure that resin flows freely to all parts of the preform 10 needing access thereto.

Figure 10:
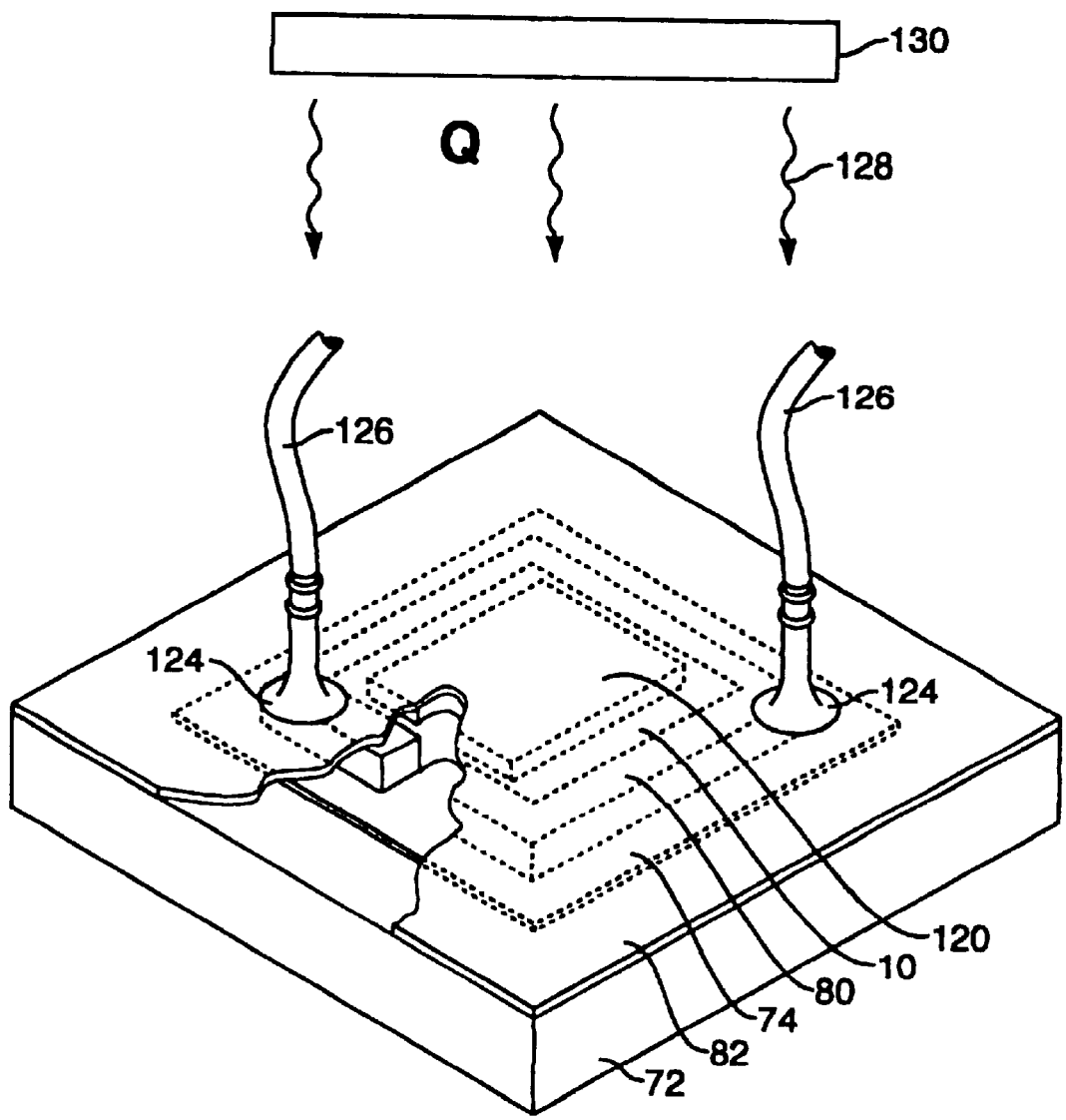
FIG. 10 is a perspective, cutaway view of one embodiment of an apparatus for implementing a resin-packet transfer infusion of matrix resin into a preform in accordance with the invention.

Referring to FIG. 10, a packet 120 or envelope 120 may be laid over a preform 10 provided with breathers 80 disposed about a boundary 123 thereof. The breather 80 may replace other plumbing apparatus normally required to accept resin. Moreover, the packet 120 may replace many runners, gates, and flow paths that may require high maintenance costs for cleaning.

One or more vacuum fittings 124 may be connected by lines 126 to draw air from within the bag 82 disposed over the layup 90. As the fittings 124 draw a vacuum in the bag 82, energy 128 from a heat source 129 reduce the viscosity of a resin 94 in the packet 120 to acceptable levels. Accordingly, vacuum draw by the fitting 122 in the bag 82 apply pressure to the packet 120, both pressing from above and drawing from below, on the resin 94 in the packet 120.

Figure 11:
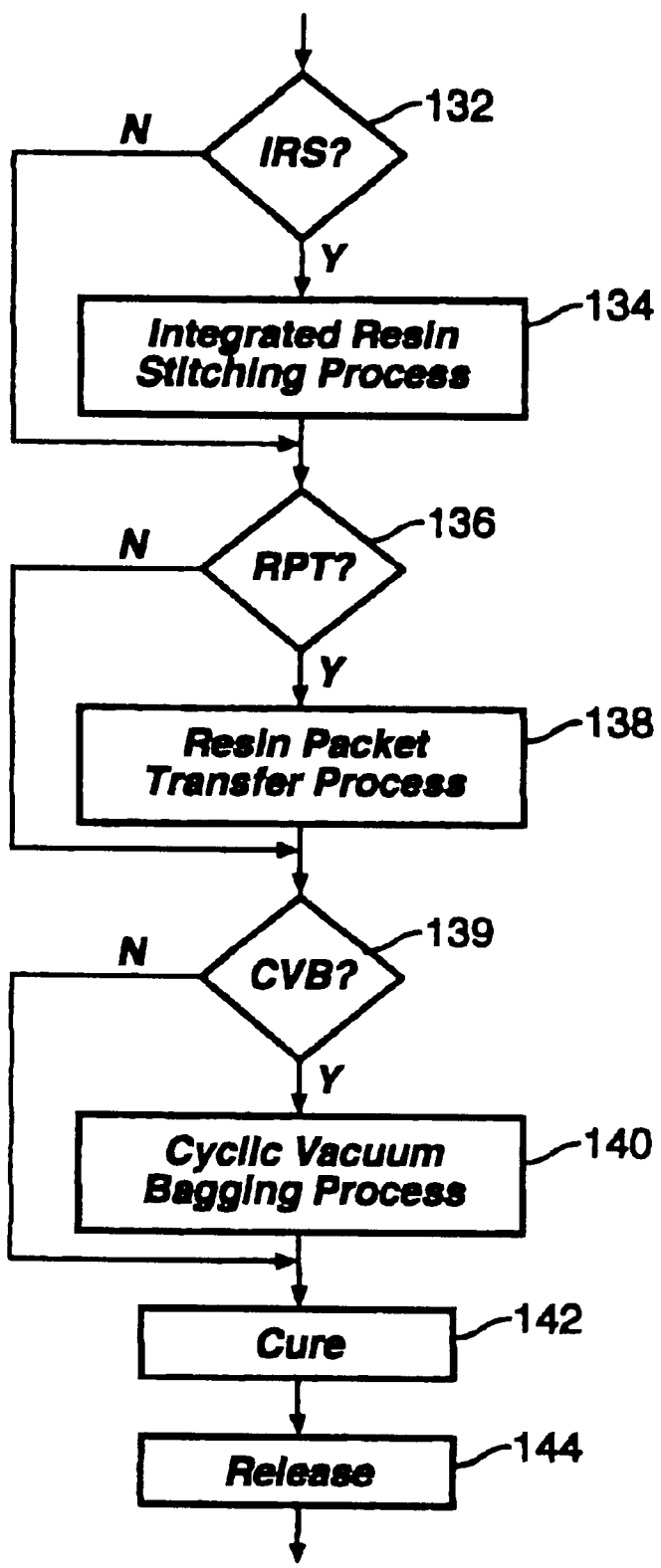
FIG. 11 is a schematic block diagram of a process, in accordance with the invention, for fabricating resin-stitched, cyclic evacuation, and vacuum bagged processing using resin packet transfer, all as optional process steps.

Referring to FIG. 11, a process 130 for manufacturing composite-material parts may include a test 132. The test 132 determines whether an integrated, homogeneous resin stitching process 134 is included. If so, the homogeneous resin-stitching process 134 prepares a preform 10. The preform 10 is structurally sufficiently rigid and stable to define the shape of an ultimate apparatus 10 to be molded in a composite, reinforced fiber configuration.

The test 136 determines whether a resin-packet transfer process 138 occurs. Resin-packet transfer process 138 rely on a minimum gating and valving equipment with a minimum setup and cleanup. If the resin-packet transfer process 138 is not used, or after use thereof, a test 136 determines whether the cyclic vacuum bagging process will follow. The cyclic vacuum bagging process may include multiple cycles of drawing a vacuum over a bag 82, and then pressurizing the outside of the vacuum bag 82. Thus, flows of air and resin 94 may freely occur inside the bag 82. After the completion of formation, the apparatus 10 is cured 142 and released 144 from a chamber 84 of a bell 86, or from a table 72 or platform 72.

A cure step 142 or cure process 142 may involve condition of heat, or other mechanisms for activating the resin 94 infused into the apparatus 10. Release 144 from a table 72, bell 86, or mold 100 prepares for duplicating the cycle repeatedly.

FIGS. 12–15 describe additional details of various alternative embodiments for implementing the homogeneous resin-stitching process 134, the resin-packet transfer process 138 and the cyclic vacuum bagging process 140.

Figure 12:
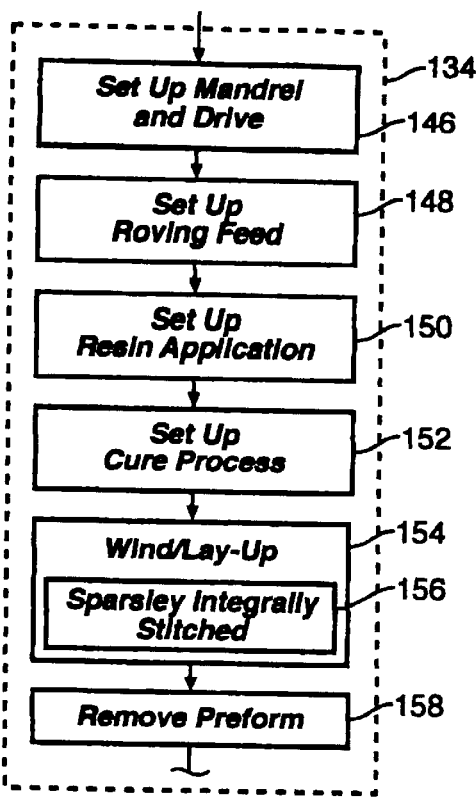
FIG. 12 is a schematic block diagram of one embodiment of a preform manufacturing process in accordance with the invention.

Referring to FIG. 12, a process 134 or homogeneous resin-stitching process 134 may include a setup step for setting up a mandrel 74 and drive for rotating same. In general, a mandrel 70 may be any type of framing device for shaping an apparatus 10, a preform 10, or the like. Thereafter, a setup step 148 sets up the feed of a roving 12 or a plurality of rovings 12 to a part 10. A setup step 150 sets up resin application to a selected one, or more, roving 12 selected to be a wet or resined roving 15, 17. The setup step 150 may involve either a bath-type or an applicator type of wetting apparatus for thoroughly wetting a roving 15, 17.

A setup process 152 for setting up a cure 142 may be done before or after resin application. In some processes, an apparatus 10 is completely laid up prior to any curing of resins. In other embodiments, partial curing, cooling, stabilizing, and the like may stabilize resins against flowing out from the apparatus 10, prior to cure.

The winding process 154 or more generally, a layup process 154 involves ash while laying down, weaving, winding, or the like, rovings 12 into a preform 10. The layup process 154 involves sparsely and integrally stitching 156 using a homogeneous resin 94 in one presently preferred embodiment. A homogeneous resin 94 is the same resin as the resin that will ultimately be used to infuse an apparatus 10 as the matrix material for making the ultimate part 10.

The cure process 157 may either partially or completely cure resin 94 wetting the rovings 15, 17 providing the stitching function. A removal process 158 may involve cutting, dismantling, sliding, slipping, or otherwise removing a mandrel 70 or other form 70 from a preform 10. Thus, although removal 158 of a preform 10 from a mandrel 70 is proper, and may involve cutting of excess material from the preform 10, typically the mandrel 70 is removed.

Figure 13:
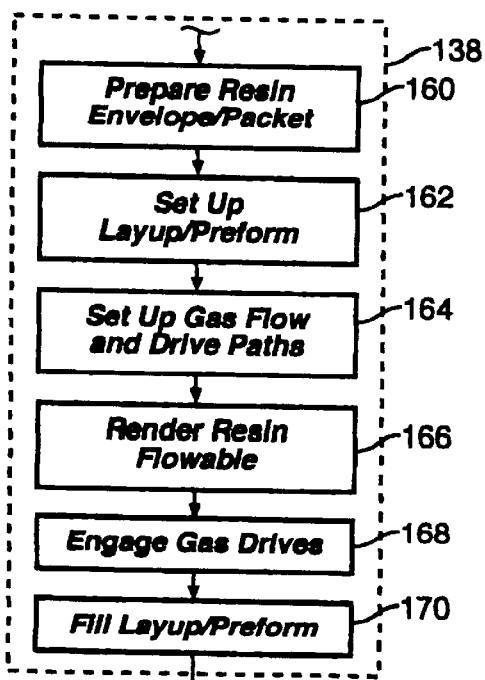
FIG. 13 is a schematic block diagram of a resin packet transfer process in accordance with the invention.

Referring to FIG. 13, a resin-packet transfer process 138 may include preparation 160 of a resin envelope or packet 95. Thereafter, a setup step 162 sets up a layup or preform 10. The homogeneous resin-stitching process 134 may or may not be relied upon for the layup 10 used.

A setup step 164 provides conduits, drives, valves, connections, flow paths, and the like for all gas flows and drive paths. Moving air into and out of a bell 86, a bag 82, a breather 80, a preform 10, and the like, requires engineering of flow paths, pressure distributions, and the like.

A rendering step 166, renders a resin 94 flowable from a packet 95. Rendering flowable 166 a resin 94 may involve unsealing a packet 95, or may involve melting a resin, raising a temperature of a resin to reduce viscosity, or the like. In general, the rendering process 166 is a function of the type of resin selected, and its physical state at ambient temperatures.

Eventually, an engagement step 168 engages the gas drives, typically vacuum pumps or pressure pumps for moving air into and out of the vacuum bag 82, into and out of a bell 86, into or out of a mold 100, or any combination thereof. In general, gas drives may be vacuum pumps, nevertheless, vacuum and compressor systems are largely the same machines capable of differing degrees of evacuation and pressurization, and differing in how positively they can move gases.

The fill step 170 or fill process 170 involves filling the layup or preform 10 with resin 94 from the packet 95. The resin 94 in one presently preferred embodiment of an apparatus and method in accordance with the invention may flow transversely 64e with respect to a preform 10, as the major transport direction. Although the preforms 10 are well adapted to promoting flow in any direction, a resin-packet transfer molding process 138 has the advantage of providing a resin 94 in very close proximity to the ultimate destination thereof. Thus, the fill process 170 for a layup or preform 10 may occur very rapidly once the resin 94 is reduced in viscosity to flow through the perforated packet wall 92.

Figure 14:
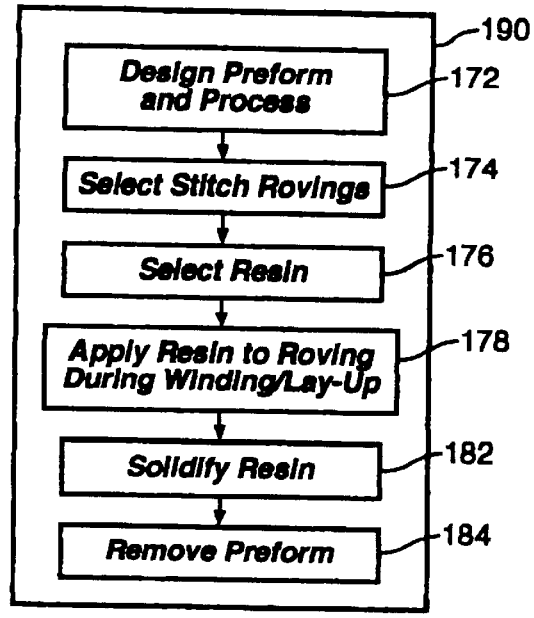
FIG. 14 is a schematic block diagram of one alternative embodiment of a resin stitching process for manufacturing a preform.

Referring to FIG. 14, a design step 172 may result in a shape, and construction technique for a preform 10 or an apparatus. The design step 172 may also be thought of as including the processes for molding a matrix material into a preform.

A select process 174 may include selecting which, whether a central, edge, or other roving 12 is to be determined as a wetted roving 15, 17, or resined tow 15, 17.

A selection step 176 determines a resin 94 to wet the tows 15, 17, both processing properties and ultimate physical properties for a resin 94 may be considered in selecting 176 a resin 94 for the stitching process. Application 178 of resin 94 to rovings 15, 17 occurs, typically, during a winding or layup process. Nevertheless, a supply 38 of roving 12 may be selected from a PrePreg variety, in which a single roving (e.g. roving 12a) may be included with other dry rovings to be cured with heat later. Nevertheless, in one presently preferred embodiment, resin 94 may be applied to rovings 15, 17 through a bath 50 of resin 94, in certain embodiments.

The solidify step 182, may be thought of as a cure step 182 for rendering the stitching rovings 15, 17 partially or completely cured. One reason for continuing to refer to resins 94 as partly or completely cured is that a cure condition often refers to a degree of cross-linking, and a degree of remaining chemical sites for crosslinking. As a practical matter, overcuring is sometimes detrimental to structural integrity or strength. Accordingly, the solidify process 182 may or may not effect a complete cure of the stitching rovings 15, 17 in order to provide some optimum cure for the overall apparatus 10 ultimately.

A removal step 184 may be accomplished in several ways. As discussed above, removal of a preform 10 from a mandrel 70 may actually involve removal of a mandrel 70 in pieces from inside a comparatively closed apparatus 10.

Figure 15:
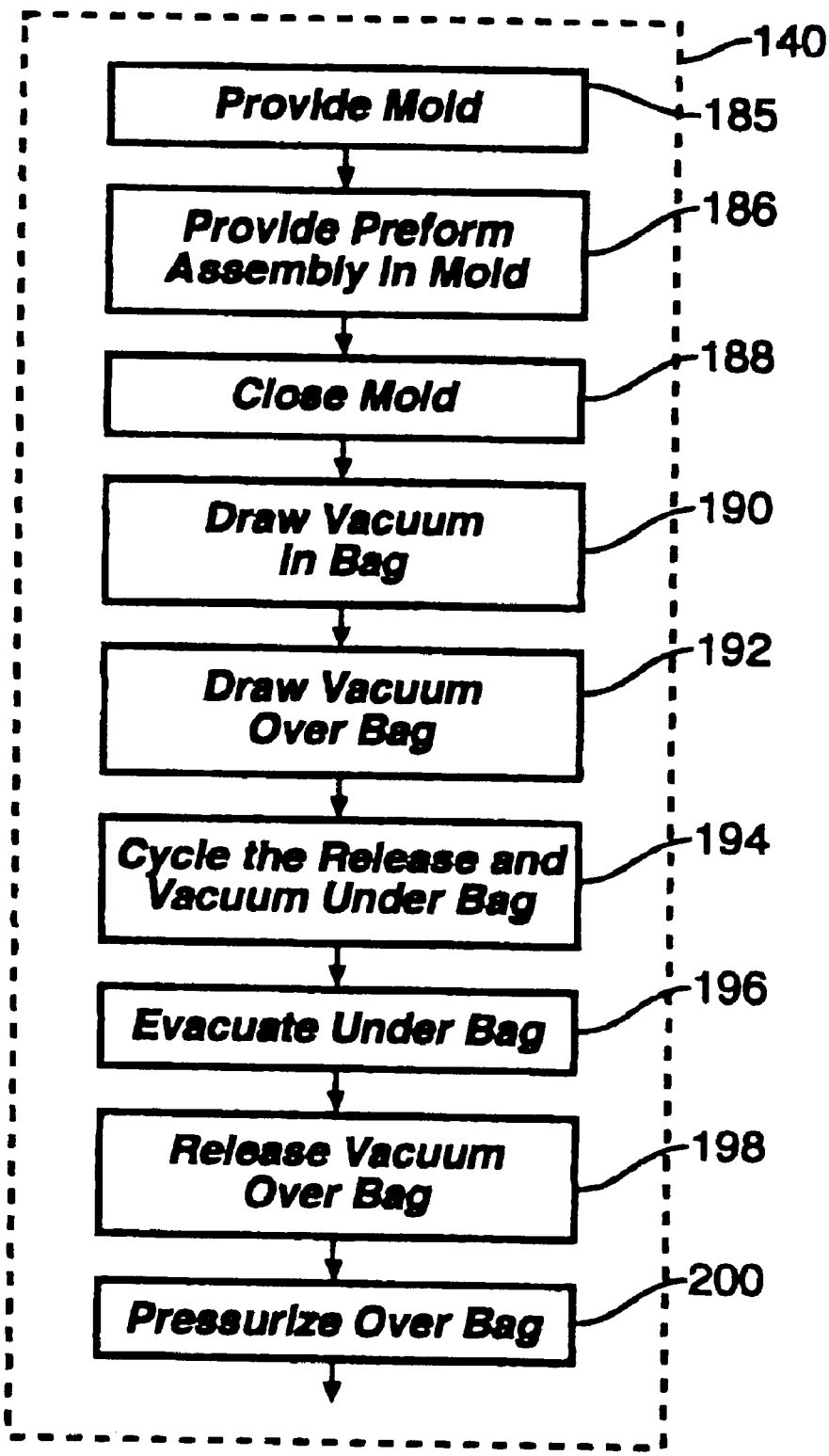
FIG. 15 is a schematic block diagram of cyclic evacuation, vacuum bagging process in accordance with the invention.

Referring to FIG. 15, a cyclic vacuum bagging process 140 may include a providing step 185 for providing a mold 100. As described, a mold 100, a table 72, a bell 86, or the like may be used in conjunction with a vacuum bag 82.

A providing step 186 may provide a preform 10 assembly for fitting in a mold 100. The preform 10 may be shaped to the interior cavity 105 of a mold 100. Alternatively, the mold 100 may actually form a mat, weaving, or other preform into shape upon closure. That is, the process 140 need not include the other processes 134, 138. Thus, the process 130 provides for selecting or rejecting any of the individual processes 134, 138, 140. Accordingly, the providing step 186 may or may not provide a pre-shaped preform 10 or insert 10 of roving 12.

A close step 188 puts the parts of a mold 100, such as a cope 106 and drag 102 together, typically with a vacuum bag 82 contained therebetween. A drawing step 190 draws a vacuum inside the bag 82, typically meaning in the portion of the cavity 105 of the mold 100 in the vacuum bag containing the preform 10.

The drawing step 192 drawing the vacuum over the bag, draws a vacuum in a portion of a bell 86, or a mold 100 between the vacuum bag, and the portion of the cavity 105, or the cavity 84, that does not contain the preform 80. Thus, the drawing step 192 tends to relieve pressure that may otherwise be created on the preform 10 by the vacuum bag 82.

A cycled process 194 may involve repeated cycling of pressurizing and releasing a cavity 84, in a mold 105, or inside a bell 86, above the vacuum bag 82. By alternatively pressurizing and evacuating such a chamber 84, a preform may be pressurized and relieved of pressure all the time under vacuum from the bag 82, thus appropriately promoting movement of gases out of the confinement of the preform 10 and a vacuum bag 82.

Ultimately, an evacuation step 196 evacuates within the bag 82, the proper amount of gas from the preform 10. As a practical matter, the evacuation step 196 may be a continuous part of the drawing step 190. However, if cyclical evacuation and release 194 is used, the releasing step 198 is the ultimate release and vacuum in the cavity 84 of the mold 100 or bell 86. In one embodiment, an actual pressure above ambient is applied in a pressurizing step 200 over the bag 82. In the preferred embodiment, the pressurizing step 200 maybe selected according to mechanical considerations in the design of the preform 10 and the ultimate part 10 from therefrom as a fully reinforced composite material.

Figure 16:
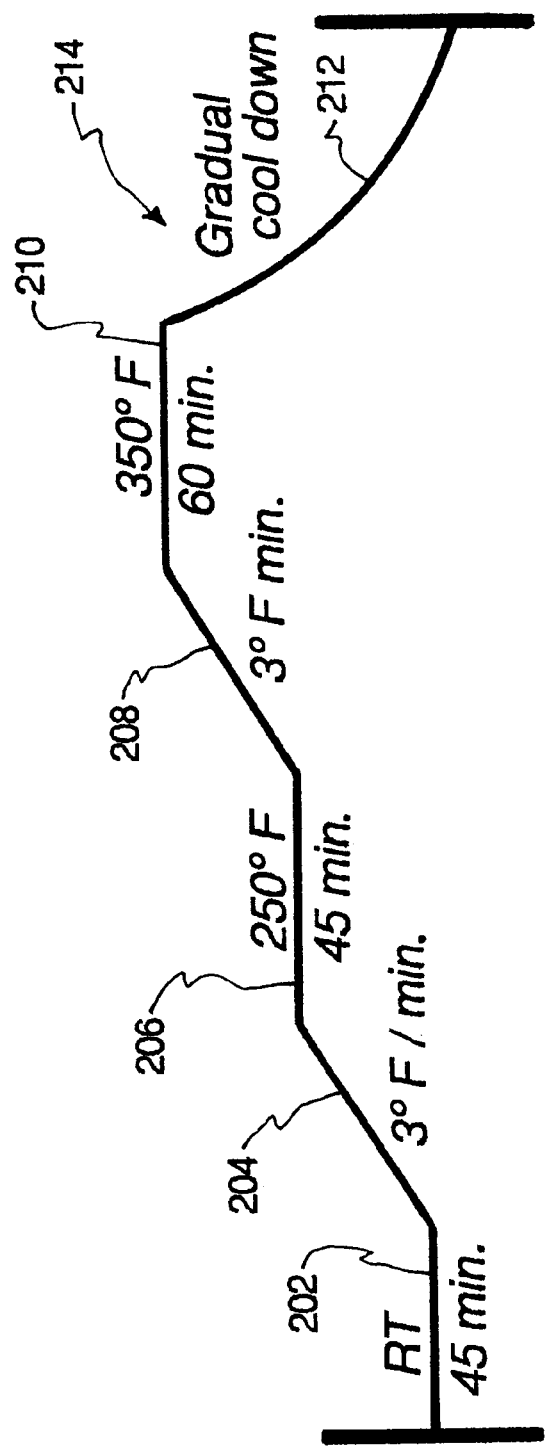
FIG. 16 is a schematic block diagram of a process and conditions for one embodiment of a method in accordance with FIGS. 11–15.

Referring to FIG. 16, a process chart illustrates the timing and temperature of one embodiment of a process for forming a part 10 or apparatus 10 in accordance with the invention. In the illustrated embodiment, a temperature soak 202 holds ambient temperature for a period of about 45 minutes. Thereafter, a temperature rise 204 escalates temperature by approximately 3 degrees Fahrenheit. Again, a temperature hold 206 or temperature soak 206 maintains temperature for 45 minutes at approximately 250 degrees Fahrenheit. Again, a temperature rise 208 escalates the temperature in a mold 100 by 3 degrees Fahrenheit per minute up to a temperature of 350 degrees Fahrenheit. The temperature soak 210 maintains a 350 degree temperature for 60 minutes. Thereafter, a cooling process 212 may occur inside or outside a mold depending on the time required to maintain structural dimensions reliably. The process 214 may be repeated with single or double vacuum. Similarly, the process 214 may be executed with cyclical vacuum application as described with respect to FIG. 15.

From the above discussion, it will be appreciated that the present invention provides more rigid, high-void-fraction, resin-stitched preforms; cleaner infusion of resins by packet transfer; and pressure-cycled, free (unloaded) vacuum filling, or any combination of the foregoing.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
    a preform comprising a plurality of rovings of a reinforcing fiber laid in a pattern;
    first rovings of the plurality of rovings containing a matrix of a first quantity of a first resin of a structural polymer distributed therein proximate a first time;
    second rovings of the plurality of rovings laid dry in the pattern and configured to receive a second quantity of resin.

2. The apparatus of claim 1, wherein the number of second rovings is greater than the number of first rovings.

3. The apparatus of claim 1, wherein the pattern is selected to position the first rovings to provide resin stitching structurally supporting the second rovings in the preform, the preform being selectively and arbitrarily shaped.

4. The apparatus of claim 3, further comprising the second quantity of resin positioned to selectively wet the second rovings.

5. The apparatus of claim 4, wherein the first quantity of resin and the second quantity of resin are a single, substantially homogeneous material.

6. The apparatus of claim 4, wherein the preform has a surface, the second quantity of resin being distributed in a stabilized pattern on the surface and configured to wet the second rovings at an arbitrary time selected by a user.

7. The apparatus of claim 4, further comprising a resin packet housing the second resin, the resin packet positioned to extend longitudinally along the preform.

8. The apparatus of claim 4, wherein the first quantity of resin is substantially cured.

9. The apparatus of claim 3, further comprising the second quantity of resin infused into the second rovings, and configured to be cured into a homogeneous matrix with the first quantity of resin at a second time remote from the first time.

10. The apparatus of claim 3, wherein the second quantity of resin is responsive to temperature and selected to remain substantially unflowing at a first temperature proximate ambient temperature, and to substantially flow at a second temperature above the first temperature.

11. The apparatus of claim 3, further comprising a packet containing the second quantity of resin, wherein the packet is perforated, and the perforations are selectively sealable and openable for controlling flow of the second quantity of resin.

12. The apparatus of claim 1, further comprising a first bag positioned and sealed over the preform to bound a first space, and a sealable bell positioned over the bag for selectively pressurizing and evacuating a second space between the sealable structure and the bag.

13. The apparatus of claim 12, further comprising a second bag positioned between the first bag and the bell, the second bag configured to evacuate air from or inject air into the space that is above the first bag and below the second bag.

14. An apparatus comprising:
    a preform comprising a plurality of rovings of a reinforcing fiber laid in a pattern;
    first rovings of the plurality of rovings containing a matrix of a first quantity of a first resin of a structural polymer, the first resin having been added to the preform as wet rovings proximate a first time;
    second rovings of the plurality of rovings laid dry in the pattern and configured to receive a second quantity of resin.

15. The apparatus of claim 14 wherein the first rovings were added to the preform via filament winding.

16. The apparatus of claim 14 wherein the number of first rovings is sufficient to hold the preform together.

17. The apparatus of claim 14, wherein the number of second rovings is greater than the number of first rovings.

18. The apparatus of claim 14, wherein the pattern is selected to position the first rovings to provide resin stitching structurally supporting the second rovings in the preform, the preform being selectively and arbitrarily shaped.

19. The apparatus of claim 18, further comprising the second quantity of resin infused into the second rovings, and configured to be cured into a homogeneous matrix with the first quantity of resin at a second time remote from the first time.

20. The apparatus of claim 18, wherein the second quantity of resin is responsive to temperature and selected to remain substantially unflowing at a first temperature proximate ambient temperature, and to substantially flow at a second temperature above the first temperature.

21. The apparatus of claim 18, further comprising a packet containing the second quantity of resin, wherein the packet is perforated, and the perforations are selectively sealable and openable for controlling flow of the second quantity of resin.

22. The apparatus of claim 18, further comprising the second quantity of resin positioned to selectively wet the second rovings.

23. The apparatus of claim 22, wherein the first quantity of resin and the second quantity of resin are a single, substantially homogeneous material.

24. The apparatus of claim 22, wherein the preform has a surface, the second quantity of resin being distributed in a stabilized pattern on the surface and configured to wet the second rovings at an arbitrary time selected by a user.

25. The apparatus of claim 22 further comprising a resin packet housing the second resin, the resin packet positioned to extend longitudinally along the preform.

26. The apparatus of claim 23, wherein the first quantity of resin is substantially cured.

27. The apparatus of claim 14, further comprising a first bag positioned and sealed over the preform to bound a first space, and a sealable bell positioned over the bag for selectively pressurizing and evacuating a second space between the sealable structure and the bag.

28. The apparatus of claim 27, further comprising a second bag positioned between the first bag and the bell, the second bag configured to evacuate air from or inject air into the space that is above the first bag and below the second bag.

29. An apparatus comprising:
a preform comprising a plurality of rovings of a reinforcing fiber laid in a pattern;
first rovings of the plurality of rovings containing a matrix of a first quantity of a first resin of a structural polymer distributed therein proximate a first time, the first resin being added so that the first rovings create a stitching pattern;
second rovings of the plurality of rovings laid dry in the pattern and configured to receive a second quantity of resin.

30. The apparatus of claim 29, wherein the number of second rovings is greater than the number of first rovings.

31. The apparatus of claim 29, wherein the pattern is selected to position the first rovings to provide resin stitching structurally supporting the second rovings in the preform, the preform being selectively and arbitrarily shaped.

32. The apparatus of claim 31, further comprising the second quantity of resin positioned to selectively wet the second rovings.

33. The apparatus of claim 32, wherein the first quantity of resin and the second quantity of resin are a single, substantially homogeneous material.

34. The apparatus of claim 32, wherein the preform has a surface, the second quantity of resin being distributed in a stabilized pattern on the surface and configured to wet the second rovings at an arbitrary time selected by a user.

35. The apparatus of claim 32 further comprising a resin packet housing the second resin, the resin packet positioned to extend longitudinally along the preform.

36. The apparatus of claim 32, wherein the first quantity of resin is substantially cured.

37. The apparatus of claim 31, further comprising the second quantity of resin infused into the second rovings, and configured to be cured into a homogeneous matrix with the first quantity of resin at a second time remote from the first time.

38. The apparatus of claim 31, wherein the second quantity of resin is responsive to temperature and selected to remain substantially unflowing at a first temperature proximate ambient temperature, and to substantially flow at a second temperature above the first temperature.

39. The apparatus of claim 31, further comprising a packet containing the second quantity of resin, wherein the packet is perforated, and the perforations are selectively sealable and openable for controlling flow of the second quantity of resin.

40. The apparatus of claim 29, further comprising a first bag positioned and sealed over the preform to bound a first space, and a sealable bell positioned over the bag for selectively pressurizing and evacuating a second space between the sealable structure and the bag.

41. The apparatus of claim 40, further comprising a second bag positioned between the first bag and the bell, the second bag configured to evacuate air from or inject air into the space that is above the first bag and below the second bag.

* * * * *